(12) United States Patent
Arakawa et al.

(10) Patent No.: US 9,502,969 B2
(45) Date of Patent: Nov. 22, 2016

(54) NEGATIVE REFERENCE VOLTAGE GENERATING CIRCUIT

(71) Applicant: Powerchip Technology Corporation, Hsinchu (TW)

(72) Inventors: Hideki Arakawa, Tokyo (JP); Tomofumi Kitani, Tokyo (JP)

(73) Assignee: Powerchip Technology Corporation, Hsinchu (TW)

( * ) Notice: Subject to any disclaimer, the term of this patent is extended or adjusted under 35 U.S.C. 154(b) by 0 days.

(21) Appl. No.: 14/819,452

(22) Filed: Aug. 6, 2015

(65) Prior Publication Data

US 2016/0211744 A1 Jul. 21, 2016

(30) Foreign Application Priority Data

Jan. 19, 2015 (JP) .................. 2015-007715

(51) Int. Cl.
*G05F 1/10* (2006.01)
*H02M 3/07* (2006.01)

(52) U.S. Cl.
CPC ......... *H02M 3/07* (2013.01); *H02M 2003/071* (2013.01)

(58) Field of Classification Search
None
See application file for complete search history.

(56) References Cited

U.S. PATENT DOCUMENTS

| 2003/0151448 | A1* | 8/2003 | Fujiyama | ............. | H02M 3/07 |
| | | | | | 327/536 |
| 2008/0018318 | A1 | 1/2008 | Hsu | | |
| 2012/0155168 | A1 | 6/2012 | Kim et al. | | |
| 2012/0218032 | A1 | 8/2012 | Nadimpalli | | |
| 2015/0070085 | A1* | 3/2015 | Tyrrell | ............. | G05F 3/16 |
| | | | | | 327/539 |
| 2016/0126830 | A1* | 5/2016 | Fowers | ............. | G05F 3/205 |
| | | | | | 327/536 |

FOREIGN PATENT DOCUMENTS

| CN | 101088211 | 12/2007 |
| CN | 100592153 | 2/2010 |
| CN | 102195471 | 9/2011 |
| CN | 102640405 | 8/2012 |
| JP | 10-239357 | 9/1998 |

(Continued)

OTHER PUBLICATIONS

Stanescu et al.,"High PSRR CMOS Voltage Reference for Negative IDOS", Proceedings of 2004 International Semiconductor Conference (CAS 2004), 27th Edition, Oct. 4-6, 2004, in Sinaia, Romania, pp. 311-314.

(Continued)

*Primary Examiner* — Long Nguyen
(74) *Attorney, Agent, or Firm* — Jianq Chyun IP Office

(57) ABSTRACT

A negative reference voltage generating circuit includes a switched capacitor circuit having a capacitor connected to a first and a second nodes, a first and a second switches connected to the first node, a third and a fourth switches connected to the second node; and a control circuit, generating a first to a fourth control signals to control the first to the fourth switches respectively. The control circuit applies a preset positive reference voltage to the first node to charge the capacitor during a first period, and outputs a negative voltage from the second node based on the voltage charged to the capacitor during a second period different from the first period. By repeating the first and the second periods, an inverting negative voltage of the positive reference voltage that is outputted from the second node is used as a negative reference voltage.

16 Claims, 15 Drawing Sheets

(56) References Cited

FOREIGN PATENT DOCUMENTS

| JP | 2000-339047 | 12/2000 |
|---|---|---|
| JP | 2002-367374 | 12/2002 |
| JP | 2004-350290 | 12/2004 |
| JP | 2009-016929 | 1/2009 |
| JP | 2009-074973 | 4/2009 |
| JP | 2009081984 | 4/2009 |
| TW | 510076 | 11/2002 |
| WO | 2006025099 | 3/2006 |

OTHER PUBLICATIONS

Oguey et al, "MOS Voltage Reference Based on Polysilicon Gate Work Function Difference", IEEE Journal of Solid-State Circuits, vol. SC-15, No. 3, Jun. 1980, pp. 264-269.

* cited by examiner

NEGATIVE REFERENCE VOLTAGE GENERATING CIRCUIT

CROSS-REFERENCE TO RELATED APPLICATION

This application claims the priority benefit of Japan application serial no. 2015-007715, filed on Jan. 19, 2015. The entirety of the above-mentioned patent application is hereby incorporated by reference herein and made a part of this specification.

BACKGROUND OF THE INVENTION

1. Field of the Invention

The invention relates to a negative reference voltage generating circuit. The negative reference voltage generating circuit is used in a NOR flash memory, for example, and generates a negative reference voltage.

2. Description of Related Art

FIGS. 7A and 7B are vertical cross-sectional views illustrating a NOR flash memory cell of Conventional Example 1, and are views illustrating a voltage relation required when a Fowler Nordheim programming/erasing operation is performed with a maximum voltage at 18V or 10V. FIGS. 7A and 7B include a semiconductor substrate 100, a control gate 101, a source 102, a drain 103, and a floating gate 104.

For example, a NOR flash memory features random accessing and requires a high-speed performance. As shown in FIGS. 7A and 7B, to perform the programming/erasing operation, a positive middle voltage 10V, for example, and a negative middle voltage −8V, for example, are used to replace a positive high voltage. By using the middle positive voltage and the negative middle voltage, a MOS transistor in a peripheral circuit has a performance exceeding a high voltage transistor. Since, in this configuration, a thin gate oxidation film and a gate with a short length may be used.

To generate a positive voltage, a bandgap reference voltage generating circuit, such as a peripheral circuit for a NAND flash memory, is commonly used.

PATENT DOCUMENTS

[Patent Document 1] Specification of US Publication No. 2012/0218032.
[Patent Document 2] JP Patent Publication No. 2009-016929.
[Patent Document 3] JP Patent Publication No. 2009-074973.
[Patent Document 4] Specification of US Publication No. 2008/0018318.
[Patent Document 5] JP Patent Publication No. H10-239357.
[Patent Document 6] JP Patent Publication No. 2000-339047.
[Patent Document 7] JP Patent Publication No. 2002-367374.
[Patent Document 8] Specification of US Publication No. 2012/155168.
[Patent Document 9] International Publication No. WO2006/025099.
[Patent Document 10] JP Patent Publication No. 2004-350290.

NON-PATENT DOCUMENTS

[Non-Patent Document 1] Comel Stanescu et al., "High PSRR CMOS Voltage Reference for Negative IDOS", Proceedings of 2004 International Semiconductor Conference (CAS 2004), 27th Edition, Oct. 4-6, 2004, in Sinaia, Romania.
[Non-Patent Document 2] Oguey et al., "MOS Voltage Reference Based on Polysilicon Gate Work Function Difference", IEEE Journal of Solid-State Circuits, Vol. SC-15, No. 3, June 1980.

However, to generate a negative voltage, a bandgap reference voltage generating circuit of the positive voltage as shown in FIGS. 8 and 9, instead of the bandgap reference voltage generating circuit that generates a negative voltage, is used to generate a negative reference voltage.

FIG. 8 is a circuit diagram illustrating a structure of a negative voltage generator 102 of Conventional Example 2 disclosed by Patent Document 1. In FIG. 8, the negative voltage generator 102 includes a resistor R21, a resistor R22, a differential amplifier 120, and a charge pump 121. Here, Vdd is a positive power voltage, and Vss is a ground voltage. A positive power voltage Vpp applied to the resistor R21 is adjusted according to a positive reference voltage PVref. A negative voltage Vneg generated by the negative voltage generator 102 of FIG. 8 is represented as follows:

$$Vneg = -R22/R21 \times Vpp + (1 + R22/R21) \times PVref \quad (1)$$

FIG. 9 is a circuit diagram illustrating a structure of a negative voltage generating circuit of Conventional Example 3 disclosed by Patent Documents 2 and 3. In FIG. 9, the negative voltage generating circuit includes a differential amplifier 131, a differential amplifier 132, a P channel MOS transistor (referred to as PMOS transistor in the following) P31, a PMOS transistor P32, a resistor R31, a resistor R32, and a charge pump 133. Here, Vdd is a positive power voltage, and Vss is a ground voltage. In addition, the PMOS transistors P31 and P32 form a current mirror circuit, making the same reference current Iref respectively flow through the resistors R31 and R32. A negative voltage Vneg generated by the negative voltage circuit of FIG. 9 is represented as follows:

$$Vneg = -Iref \times R32 + PVref \quad (2)$$

$$Iref = PVref/R31 \quad (3)$$

However, if a negative reference voltage Nvef is used, it is considered that a more accurate negative voltage Vneg can be generated, and a circuit structure also becomes simple. To generate the negative voltage Vneg equal to −10V, if the negative reference voltage Nvref is −1.0V±0.1V, the negative voltage Vneg is controlled within −10V±1V with a tolerance of ten times of errors. Thus, the negative voltage generating circuit requires the same precision of ±0.01 V of the bandgap reference voltage generating circuit.

FIG. 10 is a structure example of a negative voltage generating circuit using such concept. A structure of the negative voltage generating circuit is the same as the structure of a positive boost voltage generating circuit using the positive reference voltage. In FIG. 10, the negative voltage generating circuit includes a resistor R41, a resistor R42, a differential amplifier 141, and a charge pump 142. In FIG. 10, the resistors R41 and R42 that form a voltage divider may be replaced with a serial circuit of capacitors. Here, a negative voltage generated by the negative voltage generating circuit of FIG. 10 is represented as follows.

$$Vneg = (R42/R41 + 1) \times NVref \quad (4)$$

An issue that arises is to realize a circuit generating the negative reference voltage NVref having a preferable precision. FIG. 11 is a circuit diagram illustrating a structure of a negative reference voltage generating circuit of Conventional Example 4. The negative reference voltage generating circuit of FIG. 11 includes a current source 50 generating the reference current Iref based on the positive reference voltage PVref, a resistor R51, a resistor R52, an N channel MOS transistor (referred to as NMOS transistor in the following) N51, and an NMOS transistor N52. The negative reference voltage generated by the negative reference voltage generating circuit of FIG. 11 is represented as follows.

$$NVref = -Iref \times R52 \qquad (5)$$

FIG. 12 is a circuit diagram illustrating a structure of a negative reference voltage generating circuit of Conventional Example 5. In FIG. 12, the negative voltage generating circuit includes a resistor R61, a resistor R62, and a differential amplifier 160. The negative reference voltage generated by the negative reference voltage generating circuit of FIG. 12 is represented as follows.

$$NVref = -PVref \times R62/R61 \qquad (6)$$

In the control circuits of the above conventional examples, the negative reference voltage is obtained from the positive reference voltage PVref. Thus, some errors may be generated in addition to the precision of the positive reference voltage PVref. The control circuits of the conventional examples may be divided into two following types.

(Type 1 (FIG. 11)) The reference current Iref is generated from the positive reference voltage PVref, and the negative reference voltage NVref is generated as Iref·R based on the reference current Iref (e.g., Patent Document 4). Under such circumstance, since the current mirror is used, operational conditions are not completely the same. Thus, the errors further increase, and there is additionally an offset of the differential amplifier.

(Type 2 (FIG. 12)) Type 2 is a circuit that compares the positive reference voltage PVref and the negative reference voltage NVref. The positive reference voltage PVref from an antenna power is inverted to generate the negative reference voltage NVref. Under such circumstance, since the positive reference voltage PVref is used as power source, there are additionally errors generated accordingly and errors due to a voltage drop resulting from introducing a current.

Also, Patent Document 10 exhibits the following issue. To provide a bandgap voltage reference generator not requiring a trimming circuit, a reference voltage generator unit is used. However, to realize the bandgap voltage reference generator, a heat detecting circuit of a diode is required, making the circuit structure complex. Also, the bandgap voltage generator is a positive reference voltage generator at 1.25V, for example, and does not generate a negative reference voltage.

SUMMARY OF THE INVENTION

The invention provides a negative reference voltage generating circuit that solves the issues, generates a negative reference voltage at a high precision, and has a simple circuit structure.

The negative reference voltage generating circuit of the invention includes: a switched capacitor circuit having a capacitor connected to a first node and a second node, a first switch and a second switch connected to the first node, and a third switch and a fourth switch connected to the second node; and a control circuit, generating first to fourth control signals that respectively control the first to fourth switches. In addition, the control circuit applies a preset positive reference voltage to the first node through the first switch in a first period to charge the capacitor, outputs a first negative voltage from the second node through the fourth switch in a second period different from the first period based on a voltage charged to the capacitor, and outputs the first negative voltage from the second node as a negative reference voltage by repeating the first period and the second period, and the absolute value of the first negative voltage is equal to the positive reference voltage. In the negative reference voltage generating circuit, the first node is grounded through the second switch, the second node is grounded through the third switch, the first to fourth switches are respectively formed by MOS transistors, and the negative reference voltage generating circuit includes: a first level shifter, performing level shifting to the first control signal or an inverting signal of the first control signal, generating a third control signal having two levels of a positive voltage and a second negative voltage, and applying the third control signal to a gate of the MOS transistor serving as the third switch; and a second level shifter, performing level shifting to the second control signal or an inverting signal of the second control signal, generating a fourth control signal having two levels of the positive voltage and a third negative voltage, and applying the fourth control signal to a gate of the MOS serving as the fourth switch.

According to an embodiment of the invention, the second or third negative voltage is a preset negative power voltage or a negative voltage output by the negative reference voltage generating circuit.

According to an embodiment of the invention, the negative reference voltage generating circuit further includes a switched capacitor circuit. The switched capacitor circuit has another capacitor connected to a third node and a fourth node; a fifth switch and a sixth switch connected to the third node; and a seventh switch and an eighth switch connected to the fourth node. The control circuit, generating fifth to eighth control signals and respectively controls the fifth to eighth switches. The control circuit applies a preset positive voltage to the third node through the fifth switch in a third period to charge the another capacitor, outputs a fourth negative voltage from the fourth node through the eighth switch in a fourth period different from the third first period based on a voltage charged to the another capacitor, and outputs the fourth negative voltage from the fourth node by repeating the third period and the fourth period alternately, and the fourth negative voltage is supplied to the second and third negative voltage.

According to an embodiment of the invention, the third node is grounded through the sixth switch, the fourth node is grounded through the seventh switch, the fifth to eighth switches are respectively formed by MOS transistors, and the negative reference voltage generating circuit further includes: a third level shifter, performing level shifting to the fifth control signal or an inverting signal of the fifth control signal, generating a seventh control signal having two levels of the positive voltage and the fourth negative voltage, and applies the seventh control signal to a gate of the MOS transistor serving as the seventh switch; and a fourth level shifter, performing level shifting to the sixth control signal or an inverting signal of the sixth control signal, generating an eighth control signal having levels of the positive voltage and the fourth negative voltage, and applying the eighth control signal to a gate of the MOS transistor serving as the eighth switch.

According to an embodiment of the invention, the first control signal and the second control signal are clocks of two phases that are not overlapped with each other.

According to an embodiment of the invention, the first switch is formed by a P channel MOS transistor, and the second switch and the fourth switch are formed by N channel MOS transistors.

According to an embodiment of the invention, the first to fourth switches are formed by N channel MOS transistors.

According to an embodiment of the invention, the first and second switches are formed by N channel MOS transistors, and the third and fourth switches are formed by P channel MOS transistors.

According to an embodiment of the invention, the first and third switches are formed by P channel MOS transistors, and the second and fourth switches are formed by N channel MOS transistors.

According to an embodiment of the invention, the capacitor is formed between a gate and a P-type well formed in a semiconductor substrate.

According to an embodiment of the invention, the capacitor is formed between a gate and a channel of a P channel MOS transistor formed in a semiconductor substrate.

According to an embodiment of the invention, the capacitor is formed between a floating gate and a control gate in a capacitor having a stack gate formed on a semiconductor substrate.

According to an embodiment of the invention, the capacitor is formed between a floating gate and a control gate, a P-type well in a MOS transistor having a stack gate formed on a semiconductor substrate.

According to an embodiment of the invention, the capacitor is formed with a capacitance between interconnection wires of at least one layer formed on a semiconductor substrate.

According to an embodiment of the invention, the negative reference voltage generating circuit further includes a low pass filter, and the low pass filter is connected to an output terminal of the negative reference voltage generating circuit.

Accordingly, the negative reference voltage generating circuit according to the invention is capable of providing the negative reference voltage generating circuit and the negative reference voltage generating system that generate the negative reference voltage at a high precision compared with the prior art, and the circuit structure thereof is simple and not using a complex analog circuits.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
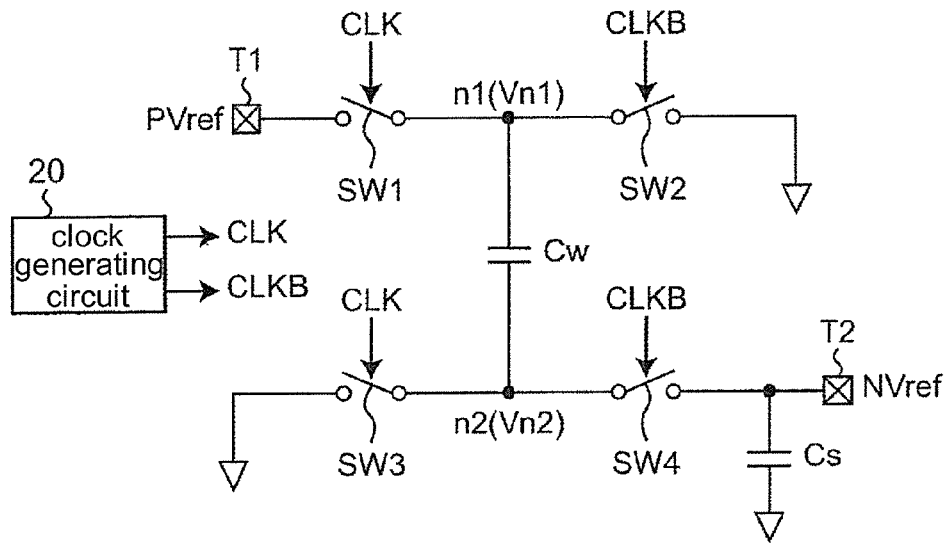
FIG. 1A is a circuit diagram illustrating a structure of a negative reference voltage generating circuit of Embodiment 1.

Reference will now be made in detail to the present preferred embodiments of the invention, examples of which are illustrated in the accompanying drawings. Wherever possible, the same reference numbers are used in the drawings and the description to refer to the same or like parts.

Embodiment 1

FIG. 1A is a circuit diagram illustrating a structure of a negative reference voltage generating circuit of Embodiment 1. In FIG. 1A, the negative reference voltage generating circuit of Embodiment 1 is capable of turning a positive reference voltage PVref into a negative voltage −PVref by using a switched capacitor circuit and outputting the negative voltage −PVref as a negative reference voltage NVref. Here, the switched capacitor circuit includes four switches SW1 to SW4, two capacitors Cw and Cs, and a clock generating circuit 20. The clock generating circuit 20 generates and outputs a clock CLK and an inverting clock CLKB. In addition, the clock CLK and the inverting clock CLKB are changed to a high level at different periods. Also, the clock generating circuit 20 is omitted in the following drawings.

In FIG. 1A, an input terminal T1 is connected to a node n1 having a node voltage Vn1 through the switch SW1 controlled by the clock CLK. The node n1 is grounded through the switch SW2 controlled by the inverting clock CLKB. The capacitor Cw is connected between the node n1 and a node n2 having a node voltage Vn2. The node n2 is grounded through the switch SW3 controlled by the clock CLK, and is connected to an output terminal T2 through the switch SW4 controlled by the inverting clock CLKB. The output terminal T2 is grounded through the capacitor Cs.

Figure 1B:
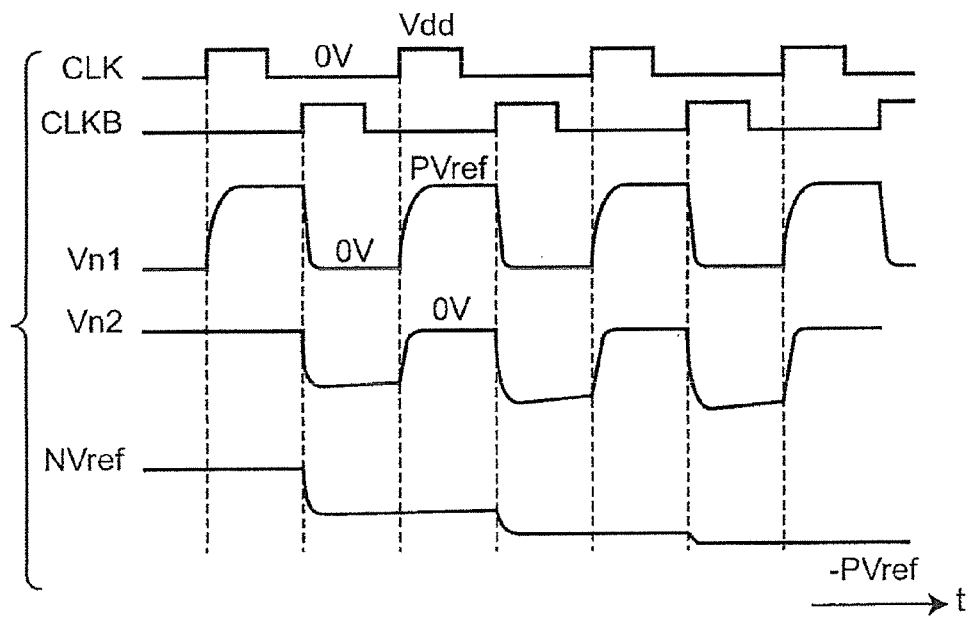
FIG. 1B is a timing chart illustrating signals of operations of the negative reference voltage generating circuit shown in FIG. 1A.

FIG. 1B is a timing chart illustrating signals of operations of the negative reference voltage generating circuit shown in FIG. 1A. As shown in FIG. 1B, when the clock CLK is at the high level, the positive reference voltage PVref and 0V (i.e., ground voltage) are connected to the capacitor Cw. Also, the nodes n1 and n2 at two ends of the capacitor Cw are switched by using the inverting clock CLKB. A switched output voltage is maintained by the capacitor Cs and output as the negative reference voltage NVref. After a plurality of clock periods, the negative reference voltage NVref becomes the negative voltage −PVref.

According to the negative reference voltage generating circuit configured as described above, the positive reference voltage PVref is applied to the node n1 in a first period, so as to charge the capacitor Cw. In a second period different from the first period, a negative voltage is output from the node n2 based on a voltage charged to the capacitor Cw. Also, the negative voltage is output from the second node n2 as the negative reference voltage NVref by repeating the first period and second period. If the capacitor Cs is sufficiently large and an output current leakage is sufficiently small, a voltage drop of the positive reference voltage PVref and a voltage variation of the output node n2 may also become sufficiently small. A DC load current does not flow from the negative reference voltage NVref as the output voltage. Even though current leakages of a transistor and a source-drain junction cannot be avoided, the current leakages are sufficiently small. Namely, because the negative voltage with an inverted voltage value of the positive reference voltage PVref based on the positive reference voltage PVref is generated, a negative reference voltage generating circuit capable of generating the negative reference voltage with a high precision and also with a simple circuit structure can be provided, as compared with the conventional art.

Embodiment 2

Figure 2A:
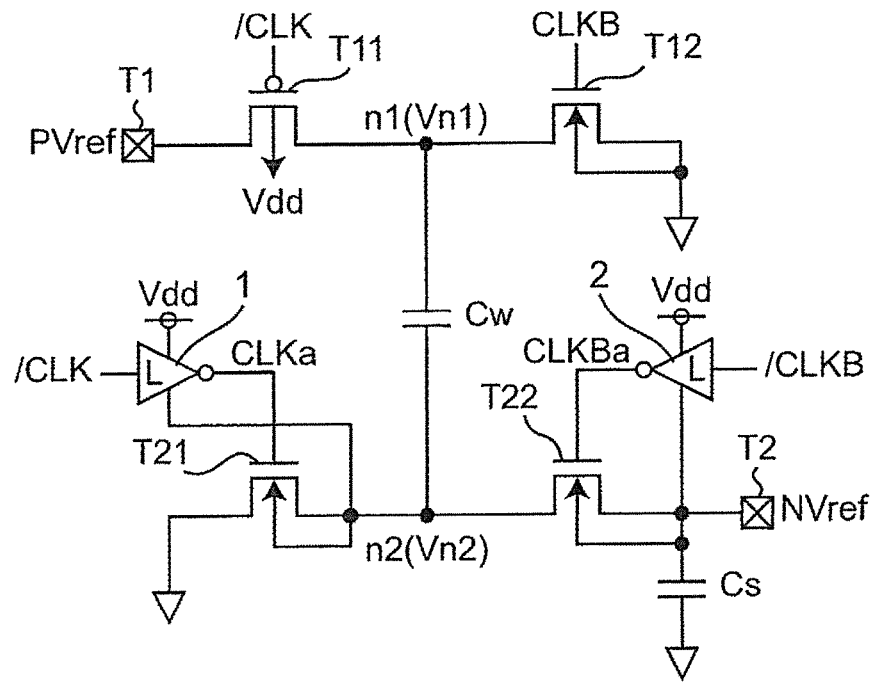
FIG. 2A is a circuit diagram illustrating a structure of a negative reference voltage generating circuit of Embodiment 2.
Figure 2B:
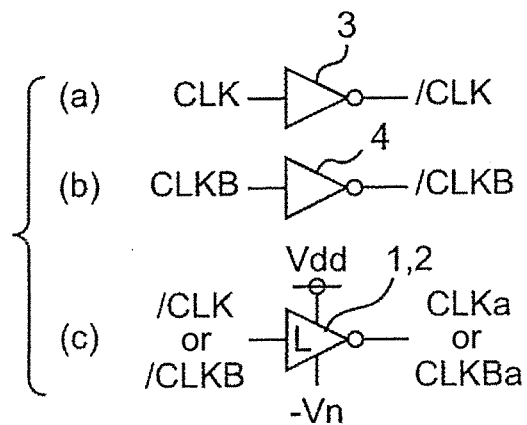
FIG. 2B is a diagram including (a), (b), and (c) parts illustrating level shifters for use in respective embodiments.

FIG. 2A is a circuit diagram illustrating a structure of a negative reference voltage generating circuit of Embodiment 2. In addition, FIG. 2B illustrates a level shifter 1 and a level shifter 2 used in the respective embodiments. Part (a) in FIG. 2B illustrates a regular inverter 3 that inverts the clock CLK into an inverting clock /CLK. Part (b) in FIG. 2B illustrates a regular inverter 4 that inverts the inverting clock CLKB into an inverted inverting clock /CLKB. Part (c) in FIG. 2B illustrates the level shifter 1 and the level shifter 2 used in the respective embodiments. The level shifter 1 and the level shifter 2 are driven by a positive power voltage Vdd and a negative power voltage −Vn, and respectively invert the inverting clock /CLK or the inverting clock /CLKB and shift levels, so as to output a clock CLKa or a clock CLKBa.

In FIG. 2A, the negative reference voltage generating circuit of Embodiment 2 differs from the negative reference voltage generating circuit of Embodiment 1 in the following ways:

(1) the switch SW1 is formed by a PMOS transistor T11. The PMOS transistor T11 has a substrate tab applied with the positive power voltage Vdd, and controlled by the inverting clock /CLK.

(2) the switch SW2 is formed by an NMOS transistor T12. the NMOS transistor T12 has a substrate tab that is grounded, and controlled by the inverting clock CLKB.

(3) The negative reference voltage generating circuit of Embodiment 2 further includes a level shifter 1. The level shifter 1 is driven by the positive power voltage Vdd and a negative power voltage −Vn2 such that the inverting clock /CLK is inverted and it's level is shifted, and outputs the clock CLKa having two levels of the positive power voltage Vdd and the negative power voltage −Vn2.

(4) the negative reference voltage generating circuit of Embodiment 2 further includes the level shifter 2. The level shifter 2 is driven by the positive power voltage Vdd and the negative power voltage NVref such that the inverting clock /CLKB is inverting and it's level is shifted, and outputs the clock CLKBa having two levels of the positive power voltage Vdd and the negative power voltage NVref.

(5) the switch SW3 is formed by an NMOS transistor T21. The node voltage Vn2 is applied to a substrate tab of the NMOS transistor T21 that is controlled by the clock CLKa.

(6) the switch SW4 is formed by an NMOS transistor T22. The negative voltage NVref is applied to a substrate tab of the NMOS transistor T22 that is controlled by the clock CLKBa.

An issue concerning how to switch the node voltage Vn2 at the node n2 may arise when the negative reference voltage generating circuit is formed by the switched capacitor circuit of Embodiment 2. Namely, the node n2 is switched between 0V and a preset negative voltage, but switching of the negative voltage is unable to be performed by the NMOS transistors T21 and T22 that are normally operated between the positive power voltage Vdd and 0V. To allow the NMOS transistors T21 and T22 to switch the node voltage Vn2, a triple well structure as shown in the following and the level shifters 1 and 2 are required, because a gate also requires a negative voltage when turning off a transistor, so as to make negative voltages of source and drain voltages possible.

Besides, the positive reference voltage PVref is 1.2V, for example, the positive power voltage Vdd is 1.8V, for example, and, at this time, the node voltage Vn2 is switched between 0V and −1.2V.

Figure 2C:
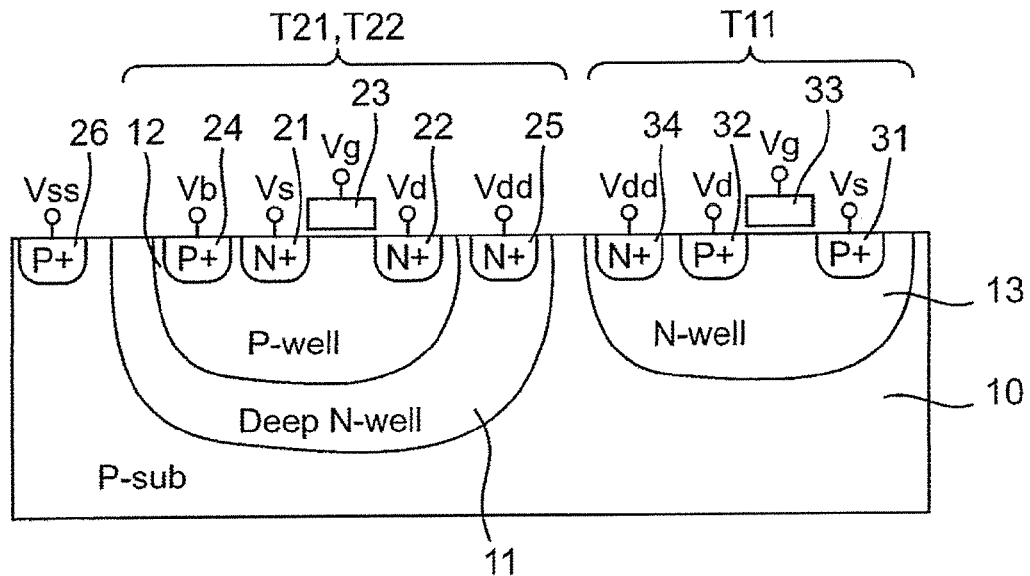
FIG. 2C is a vertical cross-sectional view illustrating a triple well structure of a MOS transistor used in a negative reference voltage generating circuit of FIG. 2A.

FIG. 2C is a vertical cross-sectional view illustrating a triple well structure of a MOS transistor used in a negative reference voltage generating circuit of FIG. 2A.

In FIG. 2C, a P-type semiconductor substrate 10 is doped with an N-type dopant, such as phosphorous, to form an N-type well 13. The N-type well 13 is doped with a P+-type dopant to form a P+-type doped region 31, thereby forming a source. The N-type well is doped with a P+-type dopant to form a P+-type doped region 32, thereby forming a drain. The source and the drain are separated by an insulating film, for example, so as to form an electrode 33, thereby forming a gate. Moreover, by doping the N-type well with an N+-type dopant, such as phosphorous, an N+-type doped region 34 is formed, thereby forming a substrate tab. Accordingly, the PMOS transistor 11 is formed.

Moreover, the P-type semiconductor substrate 10 is doped with an N-type dopant, such as phosphorous, to form a deep N-type well 11. A P-type well 12 is formed by doping into the deep N-type well 11 with a P-type dopant, such as boron, the P-type well 12 is doped with an N+-type dopant to form an N+-type doped region 21, thereby forming a source, and the P-type well 12 is doped with an N+-type dopant to form an N+-type doped region 22, thereby forming a drain. The source and the drain are separated by an insulating film, for example, so as to form an electrode 23, thereby forming a gate. Moreover, by doping the P-type well 12 with a P+-type dopant, such as boron, a P+-type doped region 24 is formed, thereby forming a substrate tab of the P-type well 12. Accordingly, the NMOS transistors T21 and T22 having the triple well structure are formed.

Moreover, by doping the P-type semiconductor substrate 10 with a P+-type dopant such as boron, a P+-type doped region 26 is formed, thereby forming a substrate tab of the P-type semiconductor substrate.

The NMOS transistors T21 and T22 having the triple well structure may be formed accordingly.

In this embodiment, the MOS transistors T11 to T22 may replace the switches SW1 to SW4 to form the negative reference voltage generating circuit using the switched capacitor circuit. Moreover, based on the negative reference voltage generating circuit, there is no voltage drop of the positive reference voltage PVref, either. In addition, a negative voltage equivalent to an inverting voltage of the positive reference voltage PVref is generated. Thus, the negative reference voltage generating circuit capable of generating the negative reference voltage with a high precision as compared with the conventional art can be provided. Also, a circuit structure of the negative reference voltage generating circuit is simple.

Embodiment 3

Figure 3A:
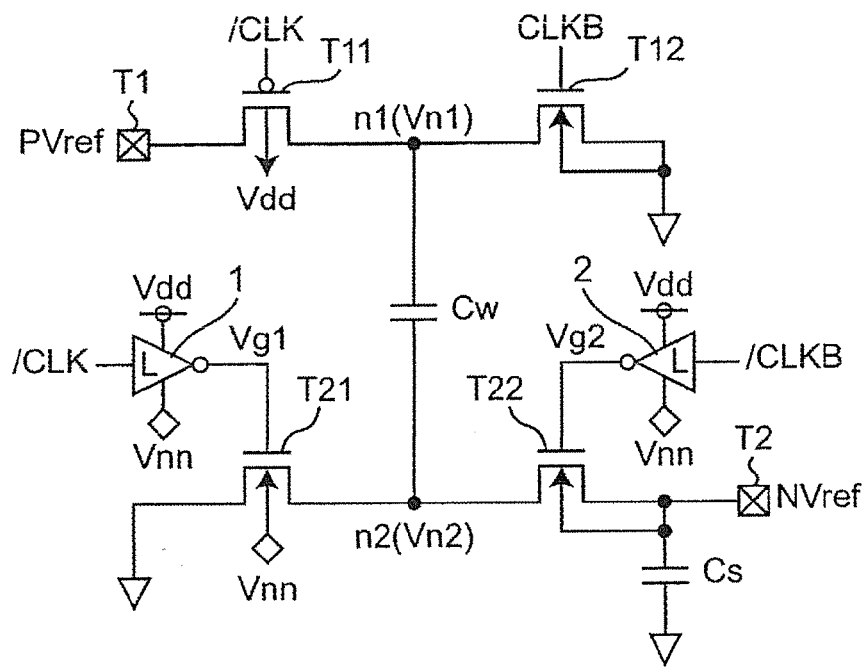
FIG. 3A is a circuit diagram illustrating a structure of a negative reference voltage generating circuit of Embodiment 3.

FIG. 3A is a circuit diagram illustrating a structure of a negative reference voltage generating circuit of Embodiment 3. According to FIG. 3A, the negative reference voltage generating circuit of Embodiment 3 differs from the negative reference voltage generating circuit of Embodiment 2 in the following ways:

(1) A preset negative voltage (preset negative power voltage) Vnn is applied as the respective negative power voltages of the level shifters 1 and 2. The negative voltage Vnn is a voltage −Vdd, for example. Also, Vdd is the positive power voltage.

(2) The negative voltage Vnn is applied to the substrate tab of the MOS transistor T21. In addition, the capacitor Cw between the nodes n1 and n2 is formed by a capacitor between interconnection wires, for example.

In Embodiment 2, a negative power terminal of the level shifter 1 is connected to the node n2. Thus, whenever the input clock /CLK is changed, a current is consumed from the node 2. Also, the level shifter 2 also consumes a current from the node NVref. Moreover, the level shifters respectively form parasitic capacitors of the node n2 and the node NVref. The current consumption caused by the parasitic capacitor of the node n2 and the level shifters 1 and 2 influence an error of the negative reference voltage NVref. Thus, the parasitic capacitor and the current consumption need to be minimized. Accordingly, as shown in FIG. 3A, by using another negative voltage Vim as the respective negative power voltages of the level shifters 1 and 2, the parasitic capacitor and the current consumption may be removed.

Figure 3B:
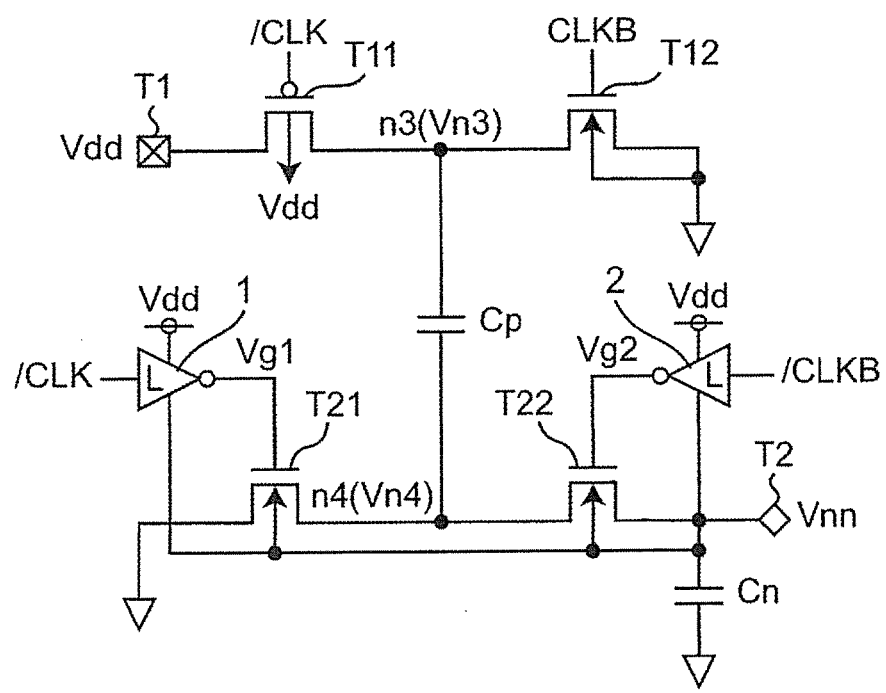
FIG. 3B is a circuit diagram illustrating a structure of a negative voltage generating circuit of Embodiment 4.
Figure 3C:
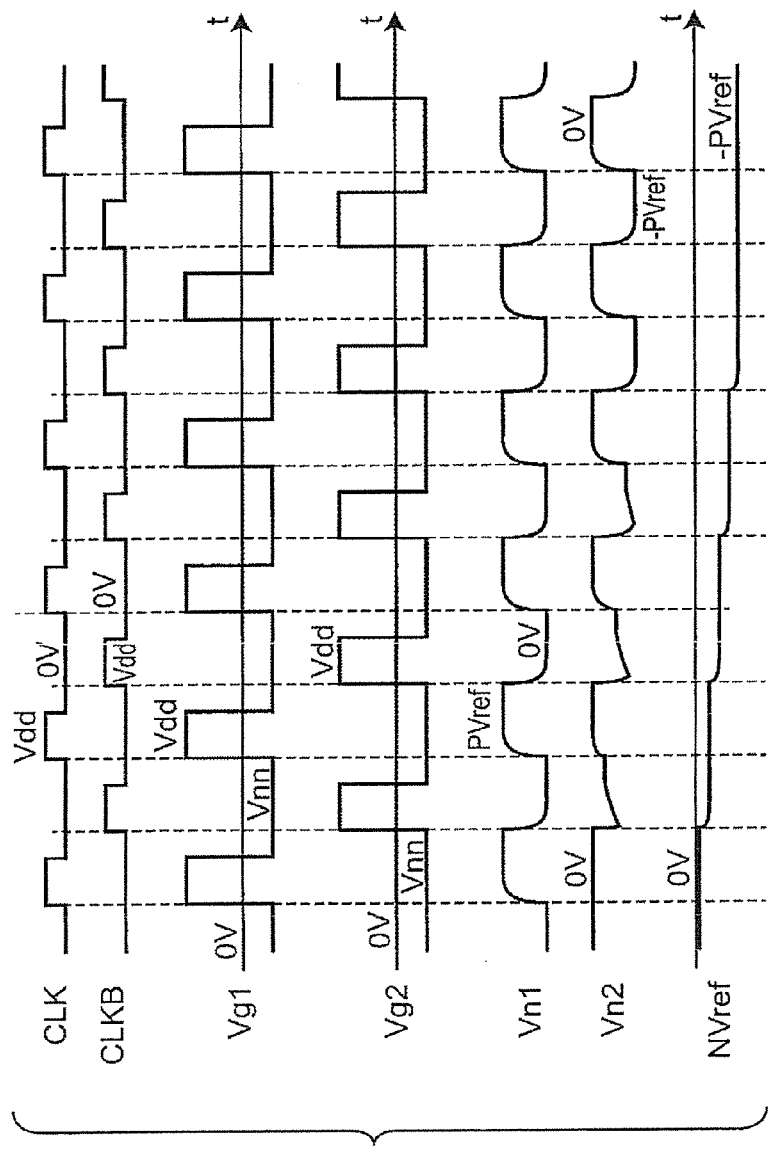
FIG. 3C is a timing chart illustrating signals of operations of the negative reference voltage generating circuit shown in FIG. 3A.

FIG. 3C is a timing chart illustrating signals of operations of the negative reference voltage generating circuit shown in FIG. 3A. Also, in an operation example of FIG. 3C, the clock CLKB is a non-overlapping inverting signal of the clock CLK.

In FIG. 3C, during a period when the clock CLK is at the high level, the clock /CLK is 0V, and the MOS transistor T11 is turned on. At this time, the gate voltage Vg1 becomes the voltage Vdd, and the MOS transistor T21 is turned on. Also, the clock CLKB is at a low level, the MOS transistor T12 is turned off, and the inverting clock /CLKB is at the high level. Thus, a gate voltage Vg2 is the negative voltage Vnn. Here, the MOS transistor T22 is turned off, the node voltage Vn1 is the positive reference voltage PVref, the node voltage Vn2 is 0V, and the capacitor Cw is being charged.

Then, during a period when the clock CLKB is at the high level, the clock CLKB is Vdd, the MOS transistor 12 is turned on, and the gate voltage Vg2 is Vdd. Besides, the MOS transistor T22 is turned on. At this time, the clock CLK is at the low level, the inverting clock /CLK is at the high level. Therefore, the MOS transistor T11 is turned off, and the gate voltage Vg1 is Vnn. Here, the MOS transistor T21 is turned off, the node voltage Vn1 is 0V, the node voltage Vn2 becomes −PVref after a plurality of clock periods and is output as the negative reference voltage NVref.

With the operation, the positive reference voltage PVref is converted into the negative voltage −PVref and output as the negative reference voltage NVref.

As described above, according to this embodiment, the parasitic capacitor of the node n2 and the current consumption from the node n2 and the node NVref may be removed through the simple control operation, thereby suppressing an error of the output voltage. Also, since the negative voltage that is precisely the inverting voltage of the positive reference voltage PVref is generated, the negative reference voltage generating circuit capable of generating the negative reference voltage with a high precision as compared with the conventional art is provided. Also, a circuit structure of the negative reference voltage generating circuit is simple.

Embodiment 4

FIG. 3B is a circuit diagram illustrating a structure of a negative voltage generating circuit of Embodiment 4. A negative voltage generating circuit of Embodiment 4 incorporates the circuit that generates the negative voltage Vnn in Embodiment 3. As shown in FIG. 3B, compared with the negative reference voltage generating circuit of Embodiment 3, the negative voltage generating circuit of Embodiment 4 differs in the following ways:

(1) The nodes n1 and n2 respectively serve as nodes n3 and n4. Also, a capacitor Cp is connected between the nodes n3 and n4. Moreover, the capacitor Cp is between the nodes n3 and n4 is formed by a capacitor between interconnection wires, for example.

(2) The negative voltage Vnn is generated at the output terminal T2. In addition, the negative voltage Vnn is applied to the respective negative power voltages of the level shifters 1 and 2 and the substrate tab of the MOS transistor T21.

Figure 3D:
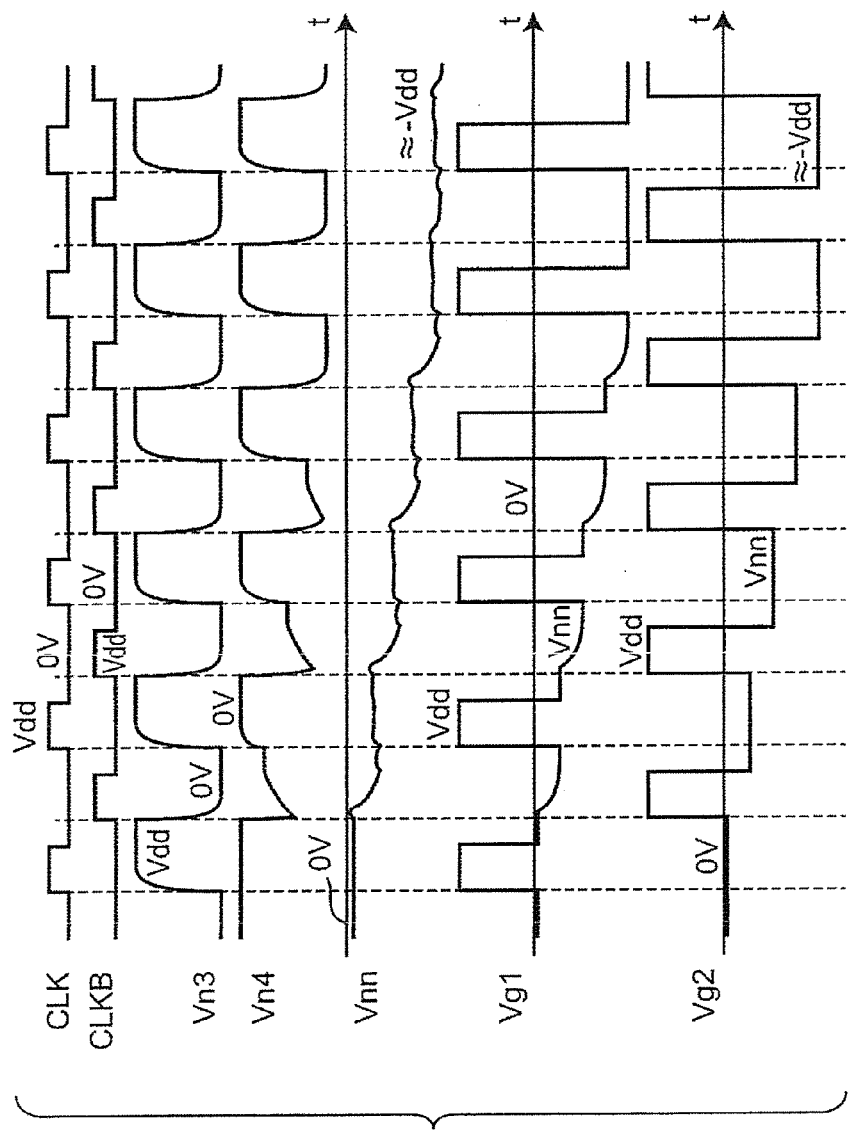
FIG. 3D is a timing chart illustrating signals of operations of the negative voltage generating circuit shown in FIG. 3B.

FIG. 3D is a timing chart illustrating signals of operations of the negative voltage generating circuit shown in FIG. 3B. Also, in an operation example of FIG. 3D, the clock CLKB is a non-overlapping inverting signal of the clock CLK.

Besides, in the respective embodiments, the clock CLK and the clock CLKB are non-overlapping clocks that may be commonly used to generate the negative voltage Vim and the negative reference voltage NVref. However, the clock CLK and the clock CLKB are not required to be the same clock or synchronized clocks. Here, the respective high level periods of the clock CLK and the clock CLKB may be generated without being overlapped with each other. Besides, as shown in FIG. 2B, the clock /CLK and the clock /CLKB are respectively the inverting signals of the clock CLK and the clock CLKB.

In FIG. 3D, during the period when the clock CLK is at the high level, the clock /CLK is 0V, and the MOS transistor T11 is turned on. At this time, the gate voltage Vg1 is the voltage Vdd, and the MOS transistor T21 is turned on. Also, the clock CLKB is at a low level, the MOS transistor T12 is turned off, and the inverting clock /CLKB is at the high level. Thus, a gate voltage Vg2 is the negative voltage Vnn. Here, the MOS transistor T22 is turned off, a node voltage Vn3 is the voltage Vdd, a node voltage Vn4 is 0V, and the capacitor Cp is being charged.

Then, during the period when the clock CLKB is at the high level, the clock CLKB is Vdd, the MOS transistor T12 is turned on, and the gate voltage Vg2 is Vdd. Besides, the MOS transistor T22 is turned on. At this time, the clock CLK is at the low level, the inverting clock /CLK is at the high level. Therefore, the MOS transistor T11 is turned off, and the gate voltage Vg1 is Vnn. Here, the MOS transistor T21 is turned off, the node voltage Vn3 is 0V, the node voltage Vn4 becomes −Vdd after a plurality of clock periods and is output as the negative voltage Vnn. Here, charges of the capacitor Cp are held separately from the capacitor Cn.

With the operation, the positive power voltage Vdd is converted into the negative voltage −Vdd and output as the negative voltage Vnn.

As described above, according to this embodiment, a negative voltage that is approximately −Vdd may be generated by using a circuit substantially the same as the circuit of Embodiment 3 without adjusting a differential amplifying circuit, comparator, etc., of the voltage.

Figure 3E:
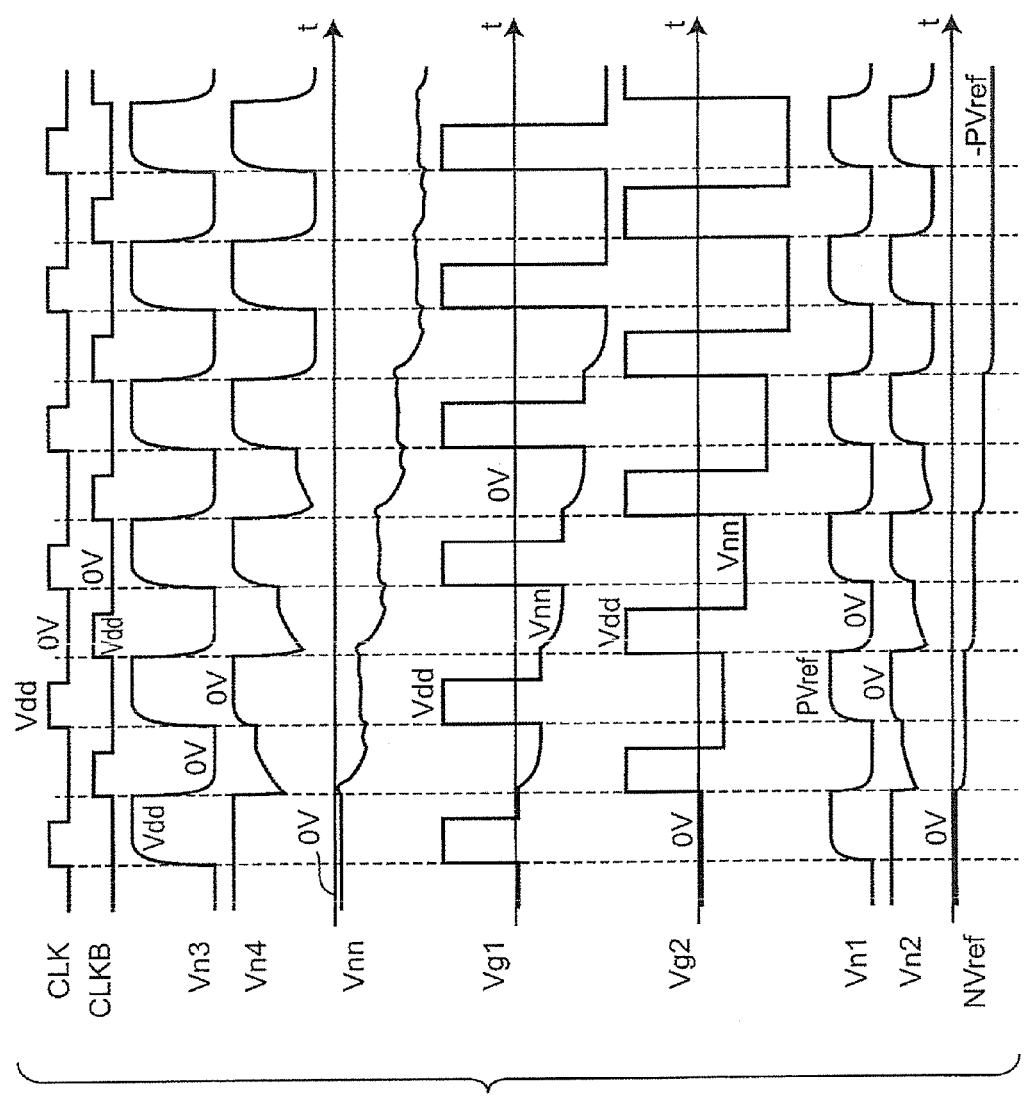
FIG. 3E is a timing chart illustrating signals of operations when the negative voltage generating circuit of Embodiment 4 is applied to a negative voltage Vnn of the negative reference voltage generating circuit of Embodiment 3 shown in FIG. 3A.

Also, FIG. 3E is a timing chart illustrating signals of operations when the negative voltage generating circuit of Embodiment 4 is applied to a negative voltage Vim of the negative reference voltage generating circuit of Embodiment 3 shown in FIG. 3A. Here, the clock CLK and the clock CLKB are commonly used to generate the negative voltage Vim and the negative reference voltage NVref.

However, different clocks, such as clocks CLK1 and CLKB1 as well as CLK2 and CLKB2, may also be used without problems.

Moreover, even though transistors in Embodiments 3 and 4 are both labeled as transistors T11 to T22, the types of transistors, channel lengths and channel widths are not required to be the same. Namely, the types of transistors, channel lengths and channel widths may be modified based on practical needs.

Embodiment 5

Figure 4A:
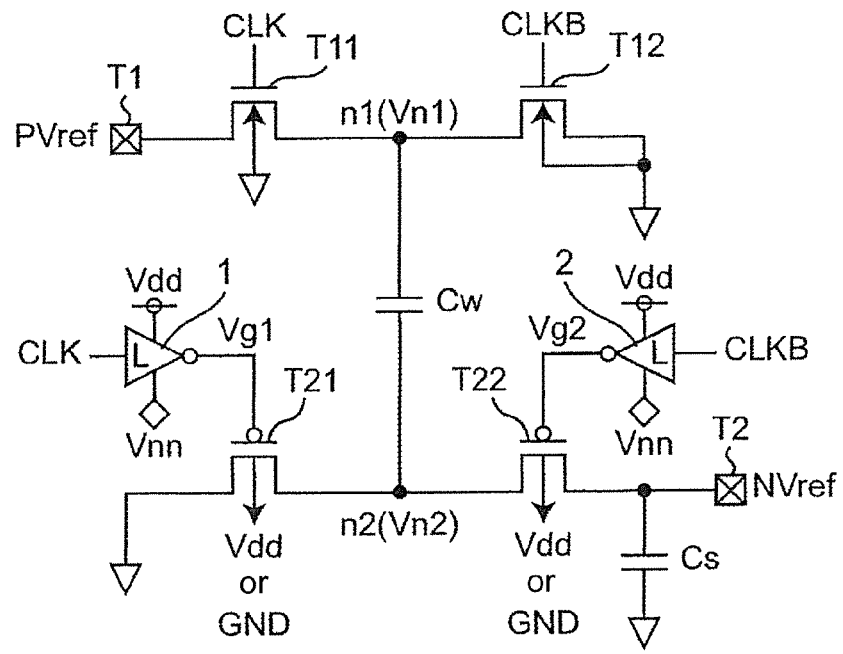
FIG. 4A is a circuit diagram illustrating a structure of a negative reference voltage generating circuit of Embodiment 5.

FIG. 4A is a circuit diagram illustrating a structure of a negative reference voltage generating circuit of Embodiment 5. According to FIG. 4A, the negative reference voltage generating circuit of Embodiment 5 differs from the negative reference voltage generating circuit of Embodiment 3 in the following way:

(1) An NMOS transistor T11 replaces the PMOS transistor T11. Moreover, the substrate tab of the NMOS transistor T11 is grounded.

(2) A PMOS transistor T21 replaces the NMOS transistor T21. Moreover, the voltage Vdd is applied to the substrate tab of the PMOS transistor T21 or the substrate tab of the PMOS transistor T21 is grounded. Also, the clock CLK is applied to the level shifter 1.

(3) A PMOS transistor T22 replaces the NMOS transistor T22. Moreover, the voltage Vdd is applied to the substrate tab of the PMOS transistor T22 or the substrate tab of the PMOS transistor T22 is grounded. Also, the clock CLKB is applied to the level shifter 2.

Compared with Embodiment 3, in this embodiment, except for the MOS transistor T12, the PMOS transistors may be replaced with NMOS transistors, and the NMOS transistors may be replaced with PMOS transistors, depending on the power voltage Vdd, the positive reference voltage PVref, and a threshold voltage Vth of the MOS transistors. In a structure example shown in FIG. 4A, an operation may be performed when Vdd≥2.5 V, PVref≈1.2 V, and Vth<0.8 V. Since a high level voltage Vdd of the clock CLK is greater than PVref+Vth, the MOS transistor T11 may allow the positive reference voltage PVref to pass. Moreover, when the MOS transistor T12 allows the voltage of 0V to pass, the MOS transistor T12 has to be an NMOS transistor. If the MOS transistor T12 is a PMOS transistor, since the voltage is unable to pass during a turn-on period when the gate voltage is 0V, the negative reference voltage generating circuit is unable to generate an accurate reference voltage.

Embodiment 6

Figure 4B:
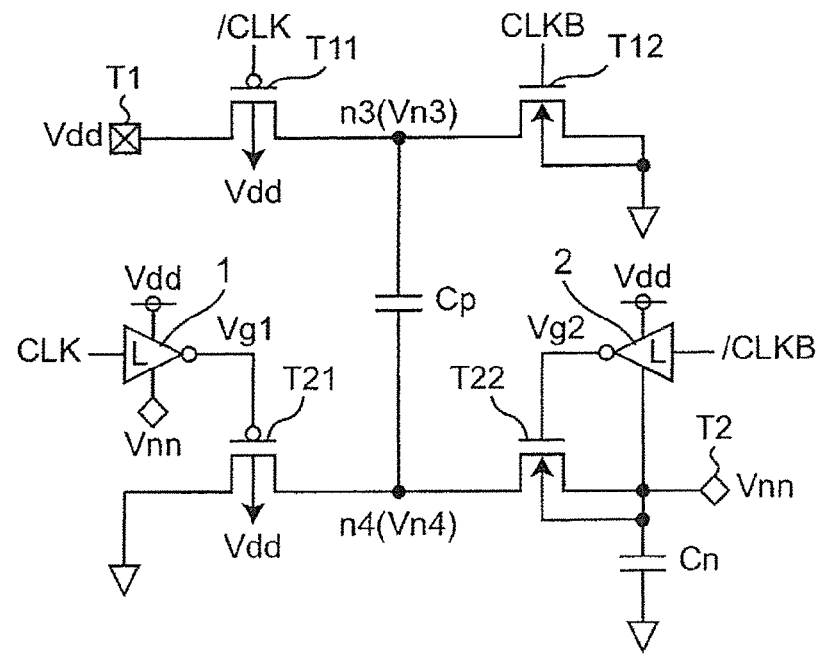
FIG. 4B is a circuit diagram illustrating a structure of a negative voltage generating circuit of Embodiment 6.

FIG. 4B is a circuit diagram illustrating a structure of a negative voltage generating circuit of Embodiment 6. According to FIG. 4B, the negative voltage generating circuit of Embodiment 6 differs from the negative generating circuit of Embodiment 4 in the following way.

(1) A PMOS transistor T21 replaces the NMOS transistor T21. Moreover, the voltage Vdd is applied to the substrate tab of the PMOS transistor T21. Also, the clock CLK is applied to the level shifter 1.

Compared with Embodiment 5, the MOS transistor T22 is not changed into a PMOS transistor in this embodiment, because if the clock CLKB is at the high level and the node n4 has a negative voltage, a drain of the PMOS transistor T22 is set as Vn4, a source thereof is set as Vim, and a gate thereof is set as Vim, the negative voltage of the node n4 is unable to be transmitted to the node T2 as Vn4<Vnn and the PMOS transistor T22 is turned off.

Figure 4C:
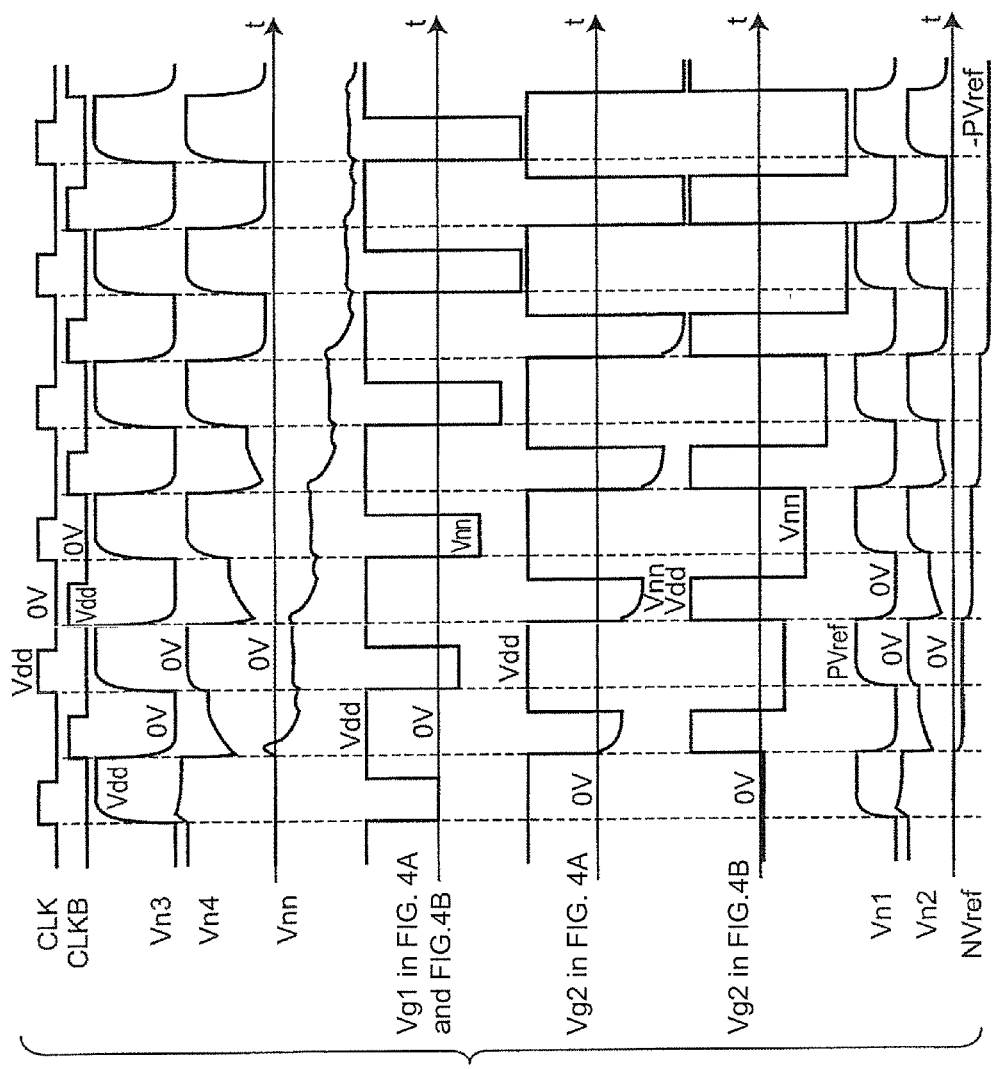
FIG. 4C is a timing chart illustrating signals of operations of the negative reference voltage generating circuit shown in FIG. 4A and the negative voltage generating circuit shown in FIG. 4B.

FIG. 4C is a timing chart illustrating signals of operations of the negative reference voltage generating circuit shown in FIG. 4A in combination with the negative voltage generating circuit shown in FIG. 4B. Except for the following, the negative reference voltage generating circuit shown in FIG. 4A and the negative voltage generating circuit shown in FIG. 4B operate in the same way as Embodiments 3 and 4.

At the first clock CLK, the node voltage Vn4 is increased up to |Vth (PMOS transistor)|. At this time, the negative voltage Vim is still at 0V, the gate voltage Vg1 is equal to 0V, and a source voltage of the MOS transistor T21 is 0V. Thus, the node voltage Vn4 as the drain voltage merely drops by the threshold voltage |Vth| of the MOS transistor. However, a charge corresponding to the power voltage Vdd−|Vth| is charged to the capacitor Cp. Therefore, the voltage may successfully drop to 0V after a plurality of clock periods by using the negative voltage Vim.

With the above operation, the positive power voltage Vdd is converted into the negative voltage Vim, and the positive reference voltage PVref is converted into the negative reference voltage NVref and output.

As described above, according to Embodiments 5 and 6, the parasitic capacitor of the node n2 and the current consumption from the node n2 and the node NVref may be removed through the simple control operation, thereby suppressing the error of the output voltage. Also, since the negative voltage that is precisely the inverting voltage of the positive reference voltage PVref is generated, the negative reference voltage generating circuit capable of generating the negative reference voltage with a high precision as compared with the conventional art is provided with a simple circuit structure of the negative reference voltage generating circuit.

Embodiment 7

Figure 4D:
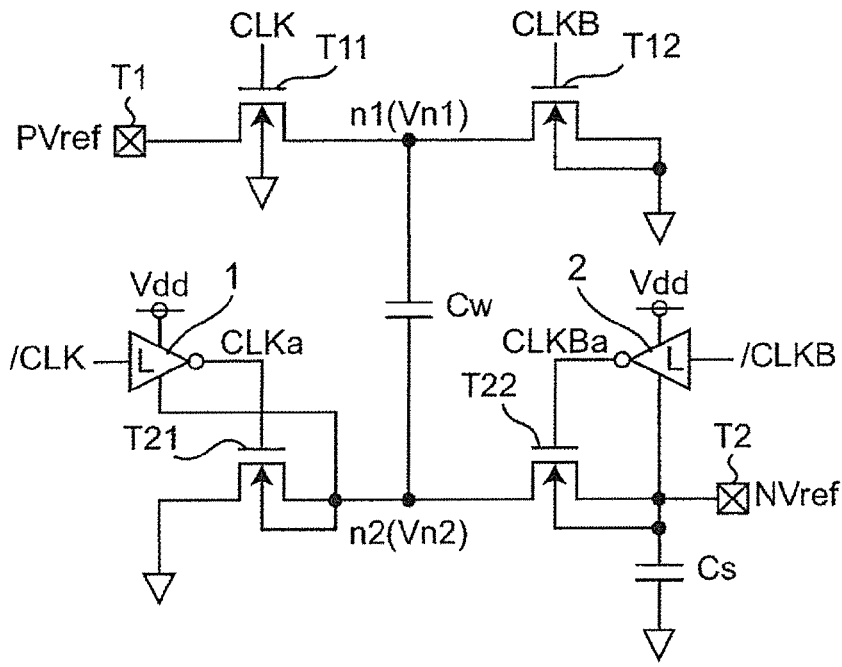
FIG. 4D is a circuit diagram illustrating Structure Example 1 of a negative reference voltage generating circuit of Embodiment 7.
Figure 4E:
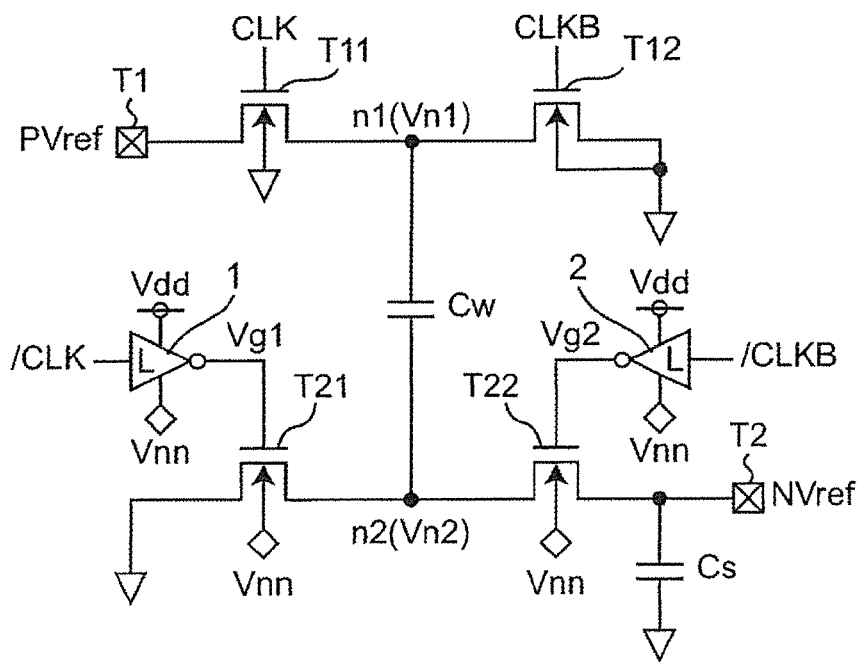
FIG. 4E is a circuit diagram illustrating Structure Example 2 of a negative reference voltage generating circuit of Embodiment 7.

FIG. 4D is a circuit diagram illustrating Structure Example 1 of a negative reference voltage generating circuit of Embodiment 7. The negative reference voltage generating circuit of the Embodiment 7 replaces the PMOS transistor T11 in Embodiment 2 with the NMOS transistor T11 (Embodiment 5). Other than the above, the structure and operation of Embodiment 7 are the same as Embodiments 2 and 5. Similarly, FIG. 4E is a circuit diagram illustrating Structure Example 2 of a negative reference voltage generating circuit of Embodiment 7, where the PMOS transistor T11 in the negative reference voltage generating circuit of Embodiment 3 of FIG. 3A is replaced by the NMOS transistor T11 (Embodiment 5 of FIG. 4A), and the substrate tab of the NMOS transistor T22 is connected to the negative voltage Vim.

Embodiment 8

In Embodiment 8, structure examples of the capacitors Cw and Cp used in Embodiments 1 to 7 are described. The capacitors are required to keep capacitance values constant whether the clock CLK or CLKB is at the high level or low level. Otherwise, the voltage may change when the voltage is inverted. Thus, capacitors between interconnection wires that are metal-oxide-metal (MOM) capacitors should be used. Moreover, a capacitor described in the following may be used.

Figure 5A:
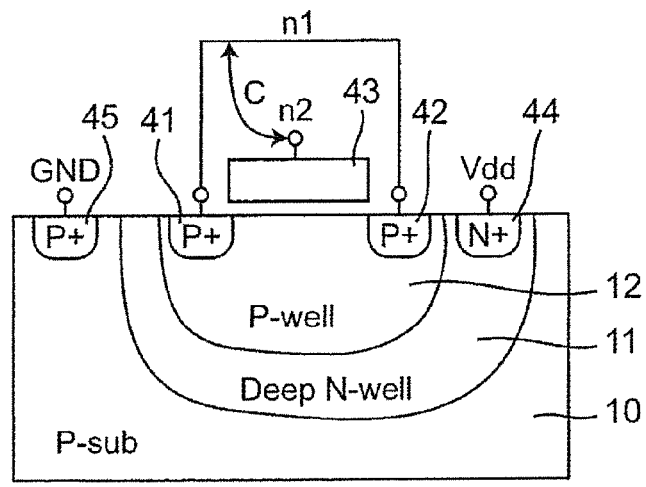
FIG. 5A is a vertical cross-sectional view illustrating a structure of Structure Example 1 of a capacitor of Embodiment 8 used in Embodiments 1 to 7.

FIG. 5A is a vertical cross-sectional view illustrating a structure of a capacitor of Structure Example 1 used in Embodiments 1 to 7. FIG. 5A illustrates a structure example of a MOS capacitor formed between a gate doped N+-type dopant and a P-well. In FIG. 5A, the P-type semiconductor substrate 10 is doped with an N-type dopant, such as phosphorous, to form a deep N-type well 11. The deep N-type well 11 is doped with a P-type dopant, such as boron, to form the P-type well 12. Two parts of the P-type well 12 are doped with P+-type dopants to form P+-type doped regions 41 and 42, thereby forming two electrode tabs. In addition, the electrode tabs are connected to the node n1. In a position between the doped regions 41 and 42, an electrode 43 is formed with separation of an insulating layer. In addition, the electrode 43 is connected to the node n2. Moreover, the deep N-type well 11 is doped with an N+-type dopant to form an N+-type doped region 44 serving as a substrate tab. The P-type semiconductor substrate 10 is doped with a P+-type dopant to form a P+-type doped region 45 serving as a substrate tab to be rounded. Here, a capacitor C may be formed between the nodes n1 and n2. Whether the clock CLK or the clock CLKB is at the high or low level, the node n1 is at the high level, and the node T12 is at the low level. Thus, the MOS capacitor is kept at an accumulation state, and the capacitance may be kept constant.

Figure 5B:
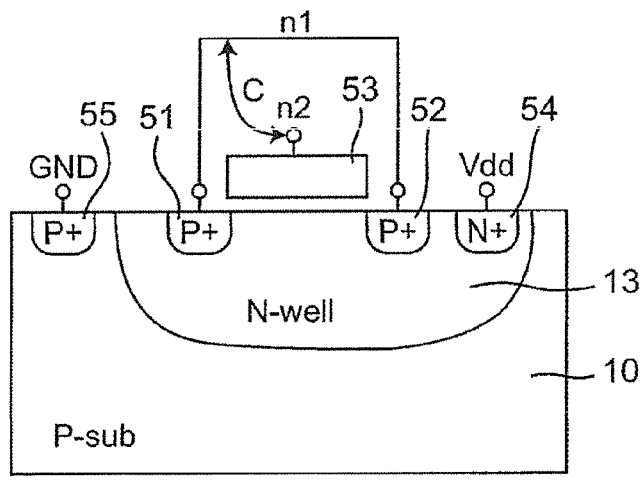
FIG. 5B is a vertical cross-sectional view illustrating a structure of Structure Example 2 of a capacitor of Embodiment 8 used in Embodiments 1 to 7.

FIG. 5B is a vertical cross-sectional view illustrating a structure of a capacitor of Structure Example 2 used in Embodiments 1 to 7. FIG. 5B illustrates a structure example of a capacitor in a channel of a gate, a source, and a drain formed by a PMOS transistor. In FIG. 5B, the P-type semiconductor substrate 10 is doped with an N-type dopant, such as boron, to form the N-type well 13. Two parts of the N-type well 13 are doped with P+-type dopants to form P+-type doped regions 51 and 52, thereby forming the source and the drain. Then, the P+-type doped regions 51 and 52 are connected to the node n1. In a position between the doped regions 51 and 52, a gate 53 is formed with separation of an insulating layer. In addition, the gate 53 is connected to the node n2. Moreover, the N-type well 13 is doped with an N+-type dopant to form an N+-type doped region 54 serving as a substrate tab. The P-type semiconductor substrate 10 is doped with a P+-type dopant to form a P+-type doped region 55 serving as a substrate tab to be grounded. Here, the capacitor C may be formed between the nodes n1 and n2. Whether the clock CLK or the clock CLKB is at a high or low level, the node n1 is at the high level, and the node n2 is at the low level. Thus, the PMOS transistor is kept at a turn-on state, and the capacitance may be kept constant.

Figure 5C:
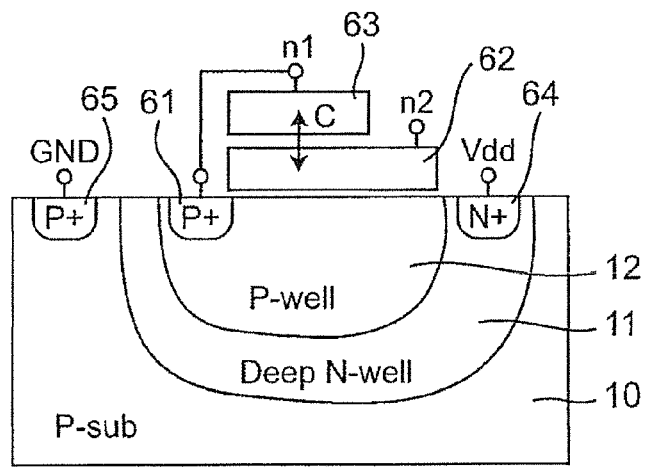
FIG. 5C is a vertical cross-sectional view illustrating a structure of Structure Example 3 of a capacitor of Embodiment 8 used in Embodiments 1 to 7.

FIG. 5C is a vertical cross-sectional view illustrating a structure of a capacitor of Structure Example 3 used in Embodiments 1 to 7. FIG. 5C illustrates a structure example of a gate capacitor formed through stacking between a floating gate 62 doped N+-type dopant and a control gate 63 connected to the P-type well 12. In FIG. 5C, the P-type semiconductor substrate 10 is doped with an N-type dopant, such as phosphorous, to form the deep N-type well 11. The deep N-type well 11 is doped with a P-type dopant, such as boron, to form the P-type well 12. The P-type well 12 is doped with a P+-type dopant to form a P+-type doped region 61, thereby forming an electrode tab. In addition, the electrode tab is connected to the node n1. The floating gate 62 is formed on the P-type well 12 near the doped region 61 with separation of an insulating layer. In addition, the floating gate is connected to the node n2. Moreover, the control gate 63 is formed on the floating gate 62 with separation of an insulating layer. In addition, the control gate 63 is connected to the node n1. Moreover, the deep N-type well 11 is doped with an N+-type dopant to form an N+-type doped region 64 serving as a substrate tab. The P-type semiconductor substrate 10 is doped with a P+-type dopant to form a P+-type doped region 65 serving as a substrate tab to be grounded. Here, the capacitor C may be formed between the nodes n1 and n2.

Figure 5D:
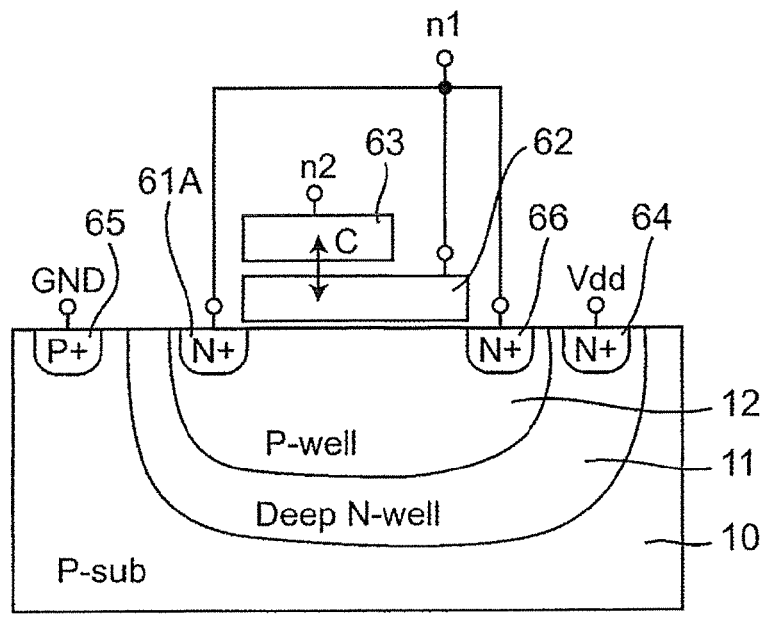
FIG. 5D is a vertical cross-sectional view illustrating a structure of Structure Example 4 of a capacitor of Embodiment 8 used in Embodiments 1 to 7.

FIG. 5D is a vertical cross-sectional view illustrating a structure of Structure Example 4 of a capacitor of Embodiment 7 used in Embodiments 1 to 7. The MOS transistor of FIG. 5B may be formed in FIG. 5C by combining the structures of FIGS. 5B and 5C like FIG. 5D (However, the channel is different.). Namely, an N+-type doped region 61A and an N+-type doped region 66 are formed at two sides of a gate as a source and a drain. Then, the source and the drain are connected to the node n1. In addition, like FIG. 5C where the MOS transistor includes the stacked floating gate 62 and control gate 63, the floating gate 62 may also be connected to the node n1, and the control gate 63 may be connected to the node n2, so as to form a capacitor between the floating gate 62 and the control gate 63.

The capacitors Cw and Cp used in Embodiments 1 to 7 may be forming according to any one of the structures shown in FIGS. 5A, 5B, 5C, and 5D. The capacitors C operate for Vn1>Vn2. Of course, the capacitor C may also be formed between two electrodes. What is essential in the embodiments is that, the output negative reference voltage NVref may be influenced by the parasitic capacitor of the node n2. Thus, the parasitic capacitor should be suppressed as much as possible. A capacitance to the substrate of the drain (node n2) of the MOS transistor T21 and the MOS transistor T22 is the main parasitic capacitor. Thus, to estimate the capacitance, when a ratio of a capacitance Cpara of the parasitic capacitor with respect to capacitor C between the nodes n1 and n2 is 1% and a variation by temperature is ±30% (−40° C. to 85° C.), if Vref=1.25 V, then Nvref=1.237 V±4 mV, and 4 mV is compatible with or slightly better than an accuracy of the positive reference voltage PVref. Here, in a manufacturing process of NAND flash memory, it is assumed that Cw=25×40 μm=4.3 pF, a width of the gate of the MOS transistor T21 or the MOS transistor T22 is 6 μm, and a power voltage Vdd is 3.3V.

Embodiment 9

Figure 6A:
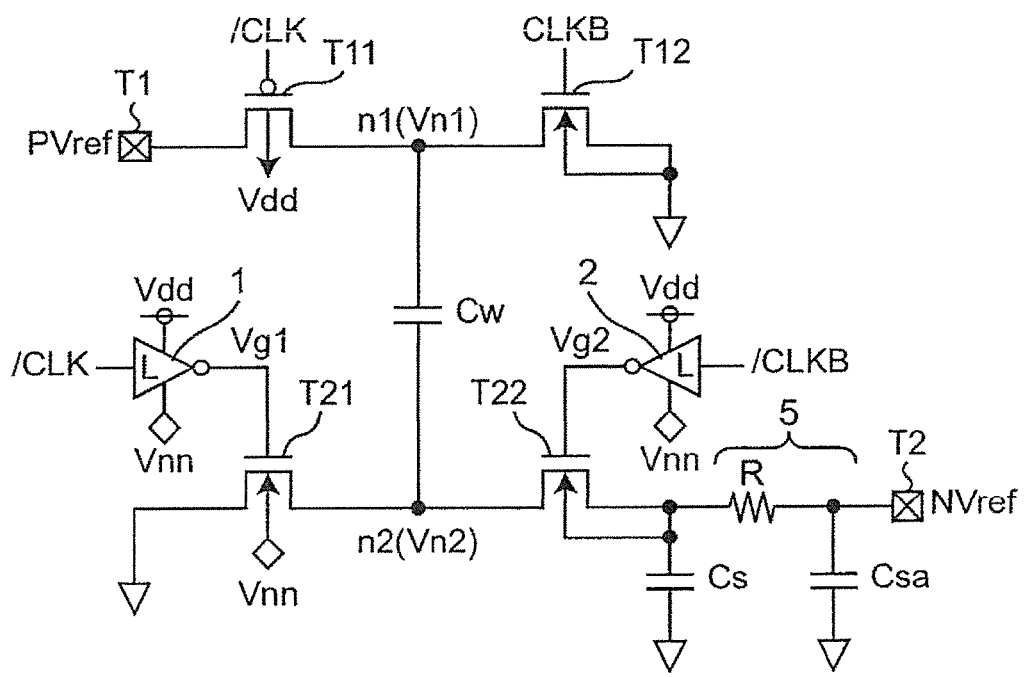
FIG. 6A is a circuit diagram illustrating a structure of a negative reference voltage generating circuit of Embodiment 9.

FIG. 6A is a circuit diagram illustrating a structure of a negative reference voltage generating circuit of Embodiment 9. As shown in FIG. 6A, the negative reference voltage generating circuit of Embodiment 9 includes: the output terminal T2 in the negative reference voltage generating circuit of Embodiment 3 has additionally an RC low pass filter 5 having a serial resistor R and a parallel capacitor Csa.

Since NVref is the negative reference voltage, the negative reference voltage NVref needs to be constant and to suppress ripple noises. However, as charge transfer from the node n2 is a repetitive operation that generates the ripple noises, it is difficult to avoid such ripple noises. To alleviate this issue, the ripple noises may be suppressed by disposing the RC filter at the output end. In particular, ripple noises generated by driving the MOS transistor T22 may be suppressed. It should be noted that while Embodiment 9 is configured by adding the RC low pass filter 5 to Embodiment 3, the RC low pass filter 5 may also be added to Embodiments 1, 2, and 4 to 8.

Embodiment 10

Figure 6B:
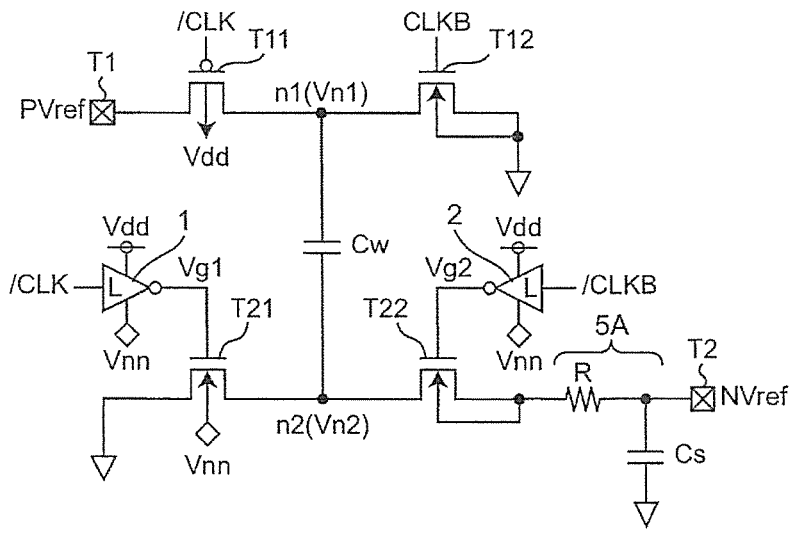
FIG. 6B is a circuit diagram illustrating a structure of a negative reference voltage generating circuit of Embodiment 10.
Figure 7A:
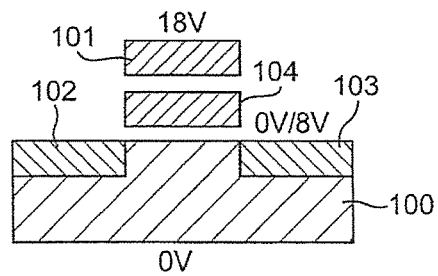
FIG. 7A is a vertical cross-sectional view illustrating an NOR flash memory cell of Conventional Example 1, and is a view illustrating a voltage relation required when a Fowler Nordheim programming/erasing operation is performed with a maximum voltage at 18V.
Figure 7B:
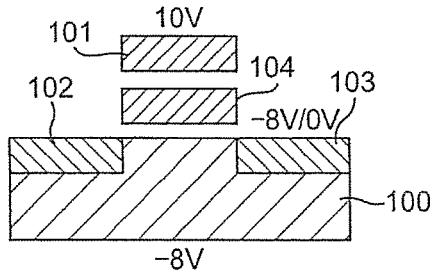
FIG. 7B is a vertical cross-sectional view illustrating an NOR flash memory cell of Conventional Example 1, and is a view illustrating a voltage relation required when a Fowler Nordheim programming/erasing operation is performed with a maximum voltage at 10 V.
Figure 8:
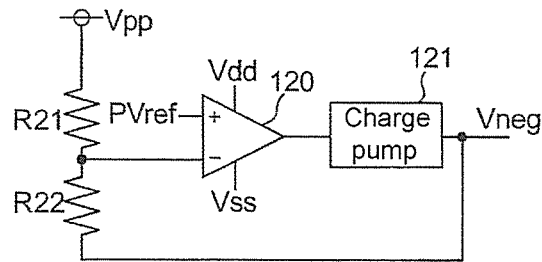
FIG. 8 is a circuit diagram illustrating a structure of a negative voltage generating circuit of Conventional Example 2.
Figure 9:
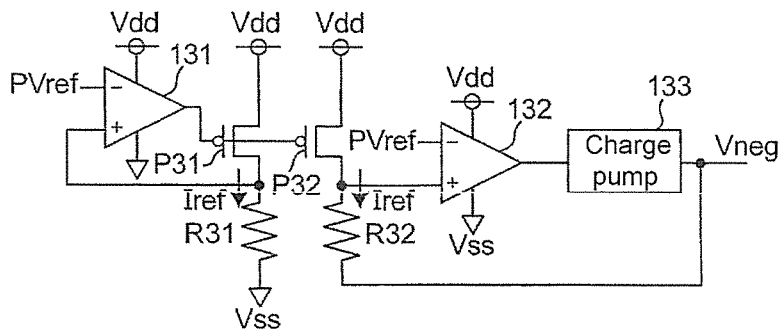
FIG. 9 is a circuit diagram illustrating a structure of a negative voltage generating circuit of Conventional Example 3.
Figure 10:
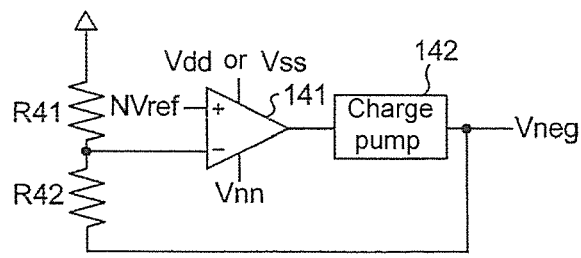
FIG. 10 is a circuit diagram illustrating a structure example of a negative voltage generating circuit using a negative reference voltage.
Figure 11:
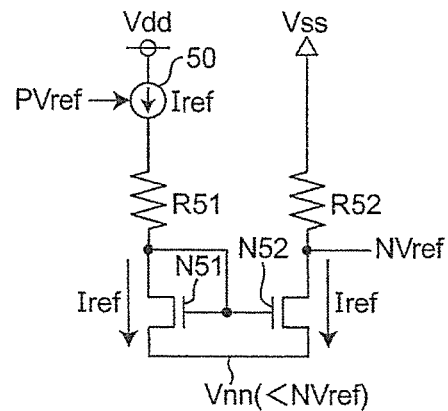
FIG. 11 is a circuit diagram illustrating a structure of a negative reference voltage generating circuit of Conventional Example 4.
Figure 12:
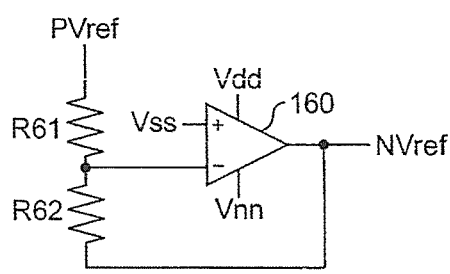
FIG. 12 is a circuit diagram illustrating a structure of a negative reference voltage generating circuit of Conventional Example 5.

FIG. 6B is a circuit diagram illustrating a structure of a negative reference voltage generating circuit of Embodiment 10. As shown in FIG. 6B, the negative reference voltage generating circuit of Embodiment 10 includes: the output terminal T2 of the negative reference voltage generating circuit of Embodiment 3 has additionally an RC low pass filter 5A having the serial resistor R and a parallel capacitor Cs (formed by connecting the original capacitor Cs to the output terminal T2 side of the serial resistor R).

In Embodiment 10, like Embodiment 9, the ripple noises may be suppressed by including the low pass filter 5A. In particular, the ripple noises generated by driving the MOS transistor T22 may be suppressed. Moreover, since the original capacitor Cs, instead of the parallel capacitor Csa, is used to form the RC low pass filter 5A, the circuit configuration is simplified. It should be noted that while Embodiment 10 is configured by adding the RC low pass filter 5A to Embodiment 3, the RC low pass filter 5A may also be added to Embodiments 1, 2, and 4 to 8.

According to above, the negative reference voltage generating circuit according to the embodiment achieves particular efficacies as follows: compared with the conventional art, the negative reference voltage may be generated at a high precision according to the variation of temperature, and the circuit structure thereof is simple.

In the above embodiments, the clocks CLK, /CLK, CLKB, and /CLKB are used to control whether the switches SW1 to SW4 and the MOS transistors T11 to T22 are turned on or off. However, the invention is not limited thereto. Preset control signals may also be respectively used.

In view of the foregoing detailed description, the negative reference voltage generating circuit according to the invention is capable of providing the negative reference voltage generating circuit and the negative reference voltage generating system that generate the negative reference voltage at a high precision compared with the prior art, and the circuit structure thereof is simple. The negative reference voltage generating circuit and the negative reference voltage generating system according to the invention may be applied to a non-volatile memory device, such as NOR flash memory, or a dynamic random access memory (DRAM), etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A negative reference voltage generating circuit, comprising:
   a switched capacitor circuit, having a capacitor connected to a first node and a second node, a first switch and a second switch connected to the first node, and a third switch and a fourth switch connected to the second node; and
   a control circuit, generating first to fourth control signals and respectively controlling the first to fourth switches, wherein the control circuit applies a preset positive reference voltage to the first node through the first switch in a first period to charge the capacitor, outputs a first negative voltage from the second node through the fourth switch in a second period different from the first period based on a voltage charged to the capacitor, and outputs the first negative voltage from the second node as a negative reference voltage by repeating the first period and the second period, and an absolute value of the first negative voltage is equal to the positive reference voltage, the first node is grounded through the second switch,
the second node is grounded through the third switch,
the first to fourth switches are respectively formed by metal oxide semiconductor transistors, and
the negative reference voltage generating circuit further includes:
a first level shifter, performing level shifting to the first control signal or an inverting signal of the first control signal, generating the third control signal having two levels of a positive voltage and a second negative voltage, and applying the third control signal to a gate of the metal oxide semiconductor transistor serving as the third switch; and
a second level shifter, performing level shifting to the second control signal or an inverting signal of the second control signal, generating the fourth control signal having two levels of the positive voltage and a third negative voltage, and applying the fourth control signal to a gate of the metal oxide semiconductor transistor serving as the fourth switch.

2. The negative reference voltage generating circuit as claimed in claim 1, wherein the second or third negative voltage is a preset negative power voltage or a negative voltage output by the negative reference voltage generating circuit.

3. The negative reference voltage generating circuit as claimed in claim 1, further comprising a further switched capacitor circuit, wherein the further switched capacitor circuit has an another capacitor connected to a third node and a fourth node; a fifth switch and a sixth switch connected to the third node; and a seventh switch and an eighth switch connected to the fourth node,
the control circuit further generating fifth to eighth control signals and respectively controls the fifth to eighth switches,
the control circuit applies another preset positive voltage to the third node through the fifth switch in a third period to charge the another capacitor, outputs a fourth negative voltage from the fourth node through the eighth switch in a fourth period different from the third period based on a voltage charged to the another capacitor, and outputs the fourth negative voltage from the fourth node by repeating the third period and the fourth period alternately, and the fourth negative voltage is supplied to the second and third negative voltage.

4. The negative reference voltage generating circuit as claimed in claim 3, wherein the third node is grounded trough the sixth switch,
the fourth node is grounded through the seventh switch,
the fifth to eighth switches are respectively formed by metal oxide semiconductor transistors, and
the negative reference voltage generating circuit further includes:
a third level shifter, performing level shifting to the fifth control signal or an inverting signal of the fifth control signal, generating the seventh control signal having values of the positive voltage and the fourth negative voltage, and applies the seventh control signal to a gate of the metal oxide semiconductor transistor serving as the seventh switch; and
a fourth level shifter, performing level shifting to the sixth control signal or an inverting signal of the sixth control signal, generating the eighth control signal having two levels of the positive voltage and the fourth negative voltage, and applying the eighth control signal to a gate of the metal oxide semiconductor transistor serving as the eighth switch.

5. The negative reference voltage generating circuit as claimed in claim 1, wherein the first control signal and the second control signal are clocks of two phases that are not overlapped with each other.

6. The negative reference voltage generating circuit as claimed in claim 3, wherein the fifth control signal and the sixth control signal are clocks of two phases that are not overlapped with each other.

7. The negative reference voltage generating circuit as claimed in claim 1, wherein the first switch is formed by a P channel metal oxide semiconductor transistor,
the second to fourth switches are formed by N channel metal oxide semiconductor transistors.

8. The negative reference voltage generating circuit as claimed in claim 1, wherein the first to fourth switches are formed by N channel metal oxide semiconductor transistors.

9. The negative reference voltage generating circuit as claimed in claim 1, wherein the first switch and the second switch are formed by N channel metal oxide semiconductor transistors, and
the third switch and the fourth switch are formed by P channel metal oxide semiconductor transistors.

10. The negative reference voltage generating circuit as claimed in claim 1, wherein the first switch and the third switch are formed by P channel metal oxide semiconductor transistors, and
the second switch and the fourth switch are formed by N channel metal oxide semiconductor transistors.

11. The negative reference voltage generating circuit as claimed in claim 1, wherein the capacitor is formed between a gate and a P-type well formed in a semiconductor substrate.

12. The negative reference voltage generating circuit as claimed in claim 1, wherein the capacitor is formed between a gate and a channel of a P channel metal oxide semiconductor transistor formed in a semiconductor substrate.

13. The negative reference voltage generating circuit as claimed in claim 1, wherein the capacitor is formed between a floating gate and a control gate in a capacitor having a stack gate formed on a semiconductor substrate.

14. The negative reference voltage generating circuit as claimed in claim 1, wherein the capacitor is formed between a floating gate and a control gate, a P-type well in a metal oxide semiconductor transistor having a stack gate formed on a semiconductor substrate.

15. The negative reference voltage generating circuit as claimed in claim 1, wherein the capacitor is formed with a capacitance between interconnection wires of at least one layer formed on a semiconductor substrate.

16. The negative reference voltage generating circuit as claimed in claim 1, wherein the negative reference voltage generating circuit further comprises a low pass filter, and the low pass filter is connected to an output terminal of the negative reference voltage generating circuit.

\* \* \* \* \*